G. D. A. KRIGBAUM.
Sheep Stock.

No. 84,198.

Patented Nov. 17, 1868.

GILES D. A. KRIGBAUM, OF ZANESVILLE, OHIO.

Letters Patent No. 84,198, dated November 17, 1868.

IMPROVEMENT IN APPARATUS FOR HOLDING SHEEP.

The Schedule referred to in these Letters Patent and making part of the same.

*To all whom it may concern:*

Be it known that I, GILES D. A. KRIGBAUM, of Zanesville, in the county of Muskingum, and State of Ohio, have invented a new and useful Improvement in Apparatus for Holding Sheep; and I do hereby declare that the following is a full, clear, and exact description thereof, which will enable others skilled in the art to make and use the same, reference being had to the accompanying drawings, forming part of this specification, in which—

Figure 1:
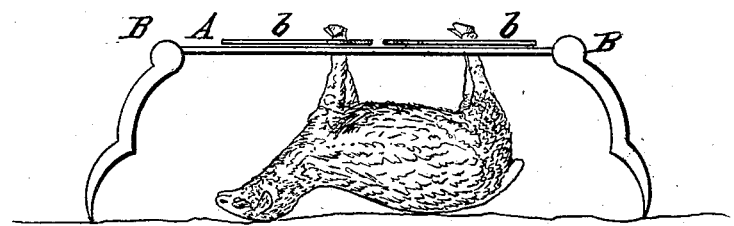
Figure 2:
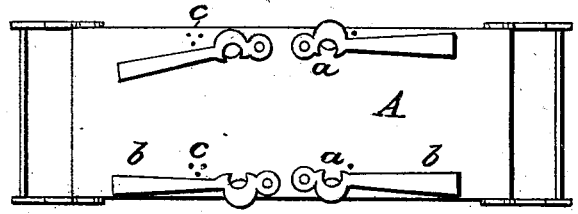

Figure 1 represents a side elevation of my improved apparatus, showing the method of holding a sheep, and Figure 2 represents a plan view of the same.

Similar letters of reference indicate like parts.

The object of this invention is to provide a simple and convenient apparatus for holding sheep by the legs, for paring their feet, or treating them for rot or other diseases.

It consists of a bench, provided with hinged legs, or legs otherwise adjustably connected to it, and with four notches, two in each edge, about the size of the legs of sheep above the ankles, and also with notched levers, which are pivoted to the bench, one to each notch in the bench, so that the notches of the levers are coincident with those of the bench.

The sheep is placed upon its back under the bench, and one leg secured in each notch by the levers, which may be held in position by pins, or otherwise.

A represents a bench, to which the legs B are hinged, or may be otherwise adjustably connected, which is provided with notches, *a a*, in each side.

*b* represents notched levers, pivoted to the bench, as shown in fig. 2, so that their notches will be coincident with those in the bench.

C represents pin-holes in the bench, by which, with the use of a pin, the levers may be locked against the legs of a sheep when suspended, as shown in fig. 1.

The legs, being adjustably connected to the bench, admit of regulating the height of the bench to the various sizes of sheep.

When it is desired to treat the feet of a sheep for any reason, it may be placed on its back, and its feet secured to the bench, as shown, when the operator, sitting on the same, will maintain it securely against the efforts of the animal to extricate itself, and may, with great ease, operate on them, while it is securely held, and by being thus suspended, it can neither hurt itself nor the operator.

Having thus described my invention,

I claim as new, and desire to secure by Letters Patent—

The sheep-holding table A, provided with the holes *a*, the legs B, and pivoted levers *b*, notched to coincide with the holes in the table, all arranged and operating as described, whereby the sheep is suspended beneath the table, with its feet clamped in the holes *a* by the levers *b*, as herein set forth, for the purpose specified.

GILES D. A. KRIGBAUM.

Witnesses:
 HORATIO W. CHANDLEE,
 B. M. DILLEY.